UNITED STATES PATENT OFFICE.

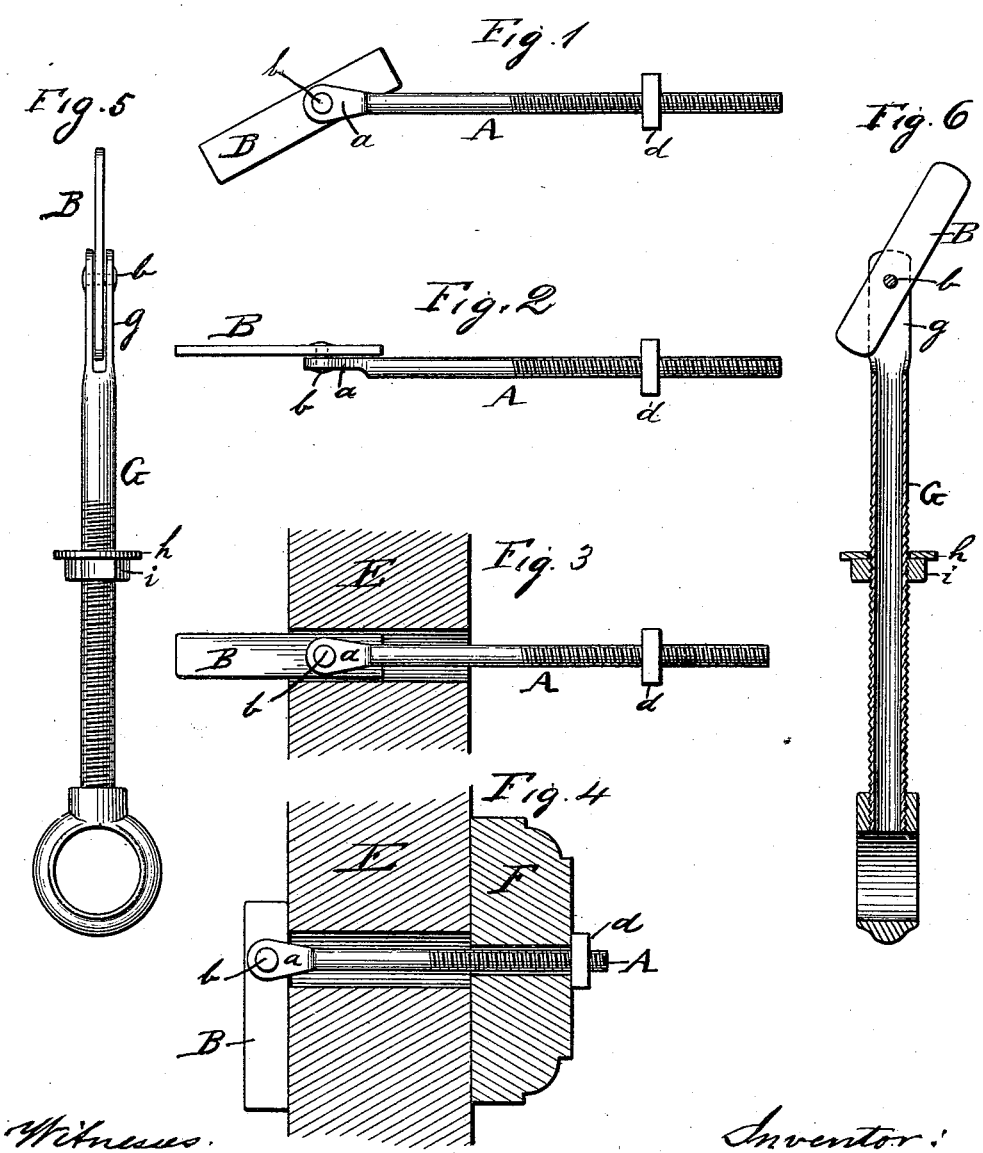

THOMAS WRIGLEY, OF OAK PARK, ILLINOIS.

DEVICE FOR SECURING FIXTURES TO WALLS OR CEILINGS.

SPECIFICATION forming part of Letters Patent No. 450,127, dated April 7, 1891.

Application filed October 7, 1890. Serial No. 367,372. (No model.)

*To all whom it may concern:*

Be it known that I, THOMAS WRIGLEY, a citizen of the United States of America, residing at Oak Park, in the county of Cook and State of Illinois, have invented certain new and useful Improvements in Devices for Securing Fixtures to Fire-Proof Walls or Ceilings, of which the following is a specification, reference being had therein to the accompanying drawings.

This my invention relates to devices for securing any sort of fixtures to a ceiling or wall built of fire-proof material—such as hollow tiling—or to a wall lined or faced with terra-cotta or marble slabs; and it consists of a screw-threaded shank having pivotally secured to one end a cross-bar providing a longer and shorter end or made one end heavier than the other, that while turned in line with the screw-shank, with its longer or heavier end forward, it can be passed through a hole drilled or punched through the tile or slab, and that such cross-bar, after thus projected through the tile or slab so as to clear the hole, by the overbalance of its longer or heavier end, will assume an angular position relative to the shank, and will then form a T-head to such shank that will bear against the inward face of the tile or slab, these shanks to be either made of round iron in shape of a screw-bolt, with a flat-eyed head formed to one end for pivotally securing the cross-bar by a rivet and with a nut engaging the screw-threaded portion of such shank for securing the fixtures direct against the ceiling or wall or for securing a block of wood, to which afterward the fixture is connected, or the shank to be formed of a piece of gas-pipe, at one end split and then flattened to provide two-eyed prongs, between which the cross-bar is pivotally secured by a rivet, such tubular shank having rigidly secured to its opposite end a ring or loop or other casting for engaging a pipe or other fixture desired to be attached and said shank being screw-threaded for engaging a clamp-nut as a counter-fastening to be screwed against the outer face of the ceiling or wall when by clamping it will hold such shank and attachments rigidly in position, all as will be more fully hereinafter described and specifically claimed.

In the accompanying drawings, Figure 1 represents a side elevation, and Fig. 2 an edge view, of a bolt provided with the pivotal cross-bar; Fig. 3, a sectional view showing the manner of inserting the bolt through a hole in the tile or terra-cotta or marble slab, and Fig. 4 a similar view showing a wooden block secured against the wall by such bolt. Fig. 5 is an elevation, and Fig. 6 a longitudinal section, of a tubular shank, with the cross-bar pivotally secured and with a ring-casting to its lower end particularly intended for suspending gas-pipes to the ceiling.

Corresponding letters of reference in the several figures of the drawings designate like parts.

A denotes the shank of the bolt flattened and punched at one end to provide an eye-head $a$.

B is a piece of flat iron punched at about one-third its entire length from one end, where it is pivotally secured by a rivet $b$ to the eye-head $a$ of bolt A. This bolt A is screw-threaded from its point toward the eye-head $a$ the desired distance to engage a nut $d$.

A hole having been punched or drilled through the hollow tile, the terra cotta, or marble slab E of the ceiling or wall, the bolt A, with the longer end of the cross-bar B turned forward to be in straight line with such bolt, is inserted and pushed through such hole until the shorter end of bar B has cleared such hole, when in the hollow space of the tile or behind the slab the longer and heavier end of bar B by its own gravity will swing to assume a position angular to the shank of the bolt A, thus forming a T-head thereto that will shoulder against the rear face of the slab, and then the wooden block F or the fixture itself can be clamped by such bolt A and nut $d$ against the ceiling or wall.

The bolt A, I generally make a greater length than required for holding the wooden block or a fixture, and after securing the same by the nut I cut off by means of a saw or file the surplus length.

In Figs. 5 and 6, G is a piece of gas-pipe split and flattened at one end to form two prongs $g$, each punched for pivotally securing between the same by a rivet $b$ the cross-bar B. The pipe G being screw-threaded, upon it is placed a washer *h* and a nut *i*, and upon its lower end is rigidly screwed the tapped hub of a rail or loop J. This fixture being secured in a hollow tile of the ceiling in the manner above described and the nut *i* being screwed up until washer *h* bears against the under side of the ceiling, it will form a rigid hanger for a pipe to be placed through the ring or loop J, and in place of this ring or loop any other attachment may be secured to tube G, arranged for the particular object to be suspended.

Instead of making the ends of cross-bar B different lengths, they may be made even lengths, with one end made thicker, so as to be heavier than the other, which will accomplish the same object.

What I claim is—

A bolt, tubular rod, or shank screw-threaded and provided with a screw-nut, a cross-bar pivoted to one end of said bolt, rod, or shank and being of unequal lengths at opposite ends of its fulcrum, and a ring, loop, or analogous appliance secured to the other end of said bolt, rod, or shank and adapted to support piping and the like, substantially as described.

In testimony whereof I affix my signature in presence of two witnesses.

THOMAS WRIGLEY.

Witnesses:
 WM. H. LOTZ,
 OTTO LUEBKERT.